United States Patent [19]

Deschaine et al.

[11] Patent Number: 5,875,191
[45] Date of Patent: Feb. 23, 1999

[54] APPARATUS AND METHOD FOR MAPPING TELECOMMUNICATIONS SIGNALS ONTO A SUBSCRIBER BUS

[75] Inventors: Stephen A. Deschaine, Garland; Manouchehr Entezari, Flower Mound; Rudolph B. Klecka, III, Dallas, all of Tex.

[73] Assignee: DSC Telecom L.P., Plano, Tex.

[21] Appl. No.: 768,316

[22] Filed: Dec. 17, 1996

[51] Int. Cl.⁶ ...................................................... H04J 3/02
[52] U.S. Cl. .......................... 370/466; 370/476; 370/532; 370/540
[58] Field of Search ................................. 370/458, 476, 370/532, 537, 540, 466, 498

[56] References Cited

U.S. PATENT DOCUMENTS

| | | | |
|---|---|---|---|
| 4,545,052 | 10/1985 | Steierman | 370/466 |
| 4,768,188 | 8/1988 | Barnhart et al. | 370/434 |
| 5,040,170 | 8/1991 | Upp et al. | 370/358 |
| 5,060,229 | 10/1991 | Tyrrell et al. | 370/476 |

Primary Examiner—Min Jung
Attorney, Agent, or Firm—Baker & Botts, L.L.P.

[57] ABSTRACT

Two T1 signals are mapped onto a subscriber bus (26) in a subscriber loop equipment (10) for transport between a bank control unit (20) and channel units (22), for example. The data channels and the signaling and control channels of the first T1 signal are mapped onto a first data stream, and the data channels and the signaling and control channels of the second T1 signal are mapped onto a second data stream. The data streams are bit-interleaved for transport on the subscriber bus (26).

28 Claims, 2 Drawing Sheets

APPARATUS AND METHOD FOR MAPPING TELECOMMUNICATIONS SIGNALS ONTO A SUBSCRIBER BUS

RELATED APPLICATIONS

This application claims the benefit of U.S. Provisional Application No. 60/020,762, *Apparatus and Method for Mapping Telecommunications Signals onto a Subscriber Bus,* filed Jun. 28, 1996. This application is related to U.S. patent application Ser. No. 08/767,689, entitled *Apparatus and Method for Mapping Telecommunications Signals onto a Subscriber Bus,* filed Dec. 17, 1996, of the same assignee, attorney docket number 36560-5447.

TECHNICAL FIELD OF THE INVENTION

This invention is related in general to the field of telecommunications systems. More particularly, the invention is related to apparatus and method for mapping telecommunications signals onto a subscriber bus.

BACKGROUND OF THE INVENTION

In the early days of telecommunication, a copper wire medium was used to carry a single information channel. Because the greatest proportion of cost is in the materials and construction of the physical link, telephony engineers have developed ways to pack multiple channels onto a single physical link. Frequency division multiplexing (FDM) and time division multiplexing (TDM) have been devised to multiplex multiple streams of analog and pulse code modulation (PCM) digital signals, respectively, into one. For digital signals, the time division multiplexing hierarchy is DS0 through DS4, where a DS0 is a single 0.064 Mbps channel, a DS1 is 24 DS0s multiplexed together, and a DS4 is 4,032 DS0s multiplexed together.

A similar time division multiplexing scheme is used in international telephone systems based on 32-channel format, where each channel is occupied by a DS0 signal. The international digital systems, based on International Telecommunication Union CCITT's G.700 Series Recommendations, are commonly called E1 or CEPT-1. The E1 signals are based on blocks of 32 channels or time slots, of which time slot 0 and time slot 16 are typically used for control and signaling, respectively.

American telecommunications equipment manufacturers desiring to compete in the international arena must design and produce equipment that operate under the international standard. Alternatively, in order to achieve compatibility, telecommunications equipment which were originally designed and manufactured to handle signals under the American standards must be modified to accommodate international signals.

SUMMARY OF THE INVENTION

Accordingly, there is a need to provide increased capacity in a subscriber loop equipment, and further provide compatibility with international requirements.

In one aspect of the invention, there is provided a channel bank having a subscriber bus with a thirty-two time slot frame. The odd data stream transported on the subscriber bus carries data channels and signaling and control channels of a first T1 signal, and the even data stream carries data channels and signaling and control channels of a second T1 signal. The odd and even data streams are bit-interleaved.

In another aspect of the invention, a method for mapping a first and second T1 signals onto a subscriber bus is provided. The method includes the steps of mapping data channels of the first T1 signal onto predetermined time slots of an odd data stream, and mapping signaling and control channels of the first T1 signal onto other predetermined time slots of the odd data stream. The data channels of the second T1 signal are further mapped onto predetermined time slots of an even data stream, and signaling and control channels of the second T1 signal are also mapped onto other predetermined time slots of the even data stream. The odd and even data streams are bit-interleaved for transport on the subscriber bus.

BRIEF DESCRIPTION OF THE DRAWINGS

For a better understanding of the present invention, reference may be made to the accompanying drawings, in which.

DETAILED DESCRIPTION OF THE INVENTION

Figure 2:
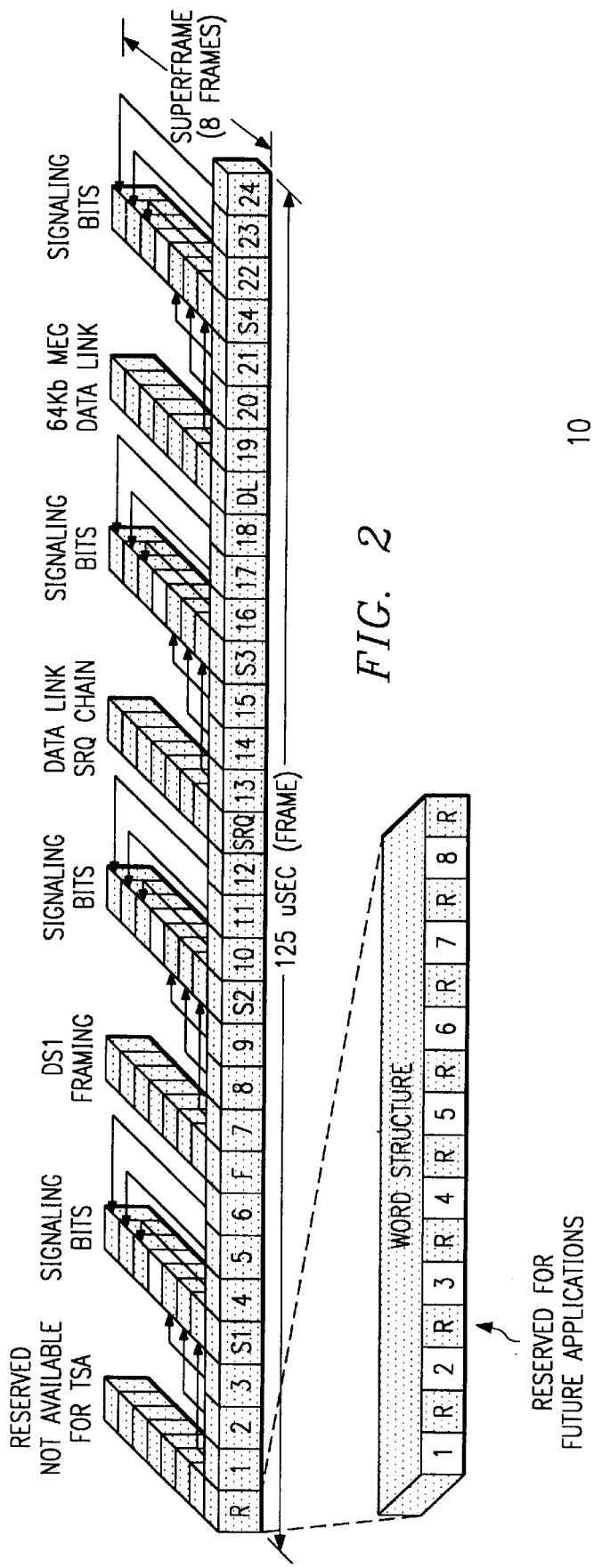
FIG. 2 is a diagram of an embodiment of a subscriber bus structure according to the teachings of the present invention.
Figure 1:
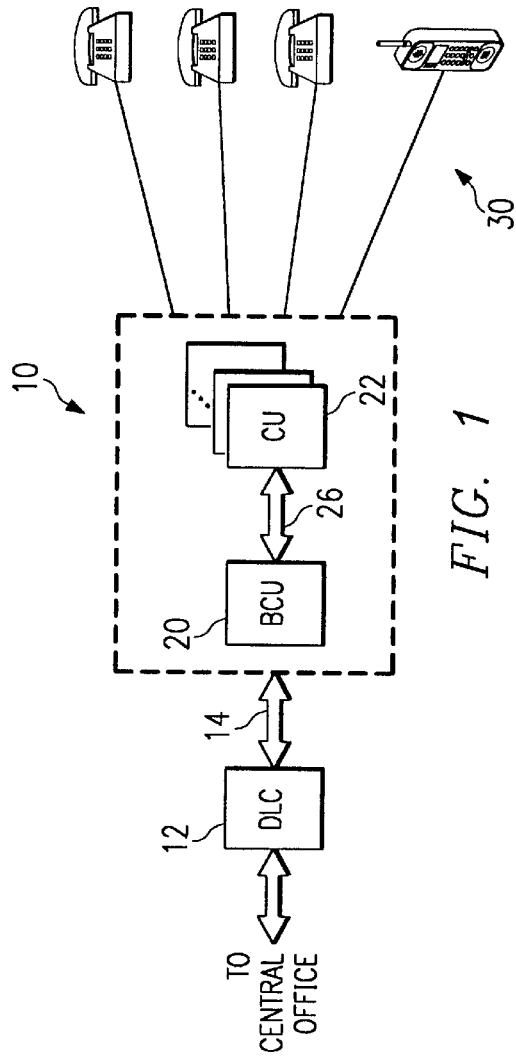
FIG. 1 is a top level block diagram of an exemplary channel bank unit constructed according to the teachings of the present invention.

The preferred embodiment(s) of the present invention is (are) illustrated in FIGS. 1–3, like reference numerals being used to refer to like and corresponding parts of the various drawings.

Referring to FIG. 1, a channel bank 10 constructed according to the teachings of the present invention is shown. Channel bank 10 is coupled to a digital loop carrier 12 through a data and control message link 14. Digital loop carrier 12 is in communications with equipment residing in a central office (not shown), such as a central office terminal (not shown) of the digital loop carrier and a digital cross-connect system (not shown).

Channel bank 10 is a DS0 to DS1 or DS0 to E1 multiplexing equipment primarily used for analog voice to pulse code modulation (PCM) conversion and multiplexing. Channel bank 10 includes a bank control unit (BCU) 20, which may be coupled to more than one channel unit (CU) 22 via a subscriber bus 26. Channel units 22 may operate at DS1 and DS3 rates, as well as international rates such as E1. A plurality of subscriber equipment 30 may be coupled to each channel unit 22.

The data carried on subscriber bus 26 has the exemplary format shown in FIG. 2. Each frame includes 32 time slots or channels, eight of which are reserved or devoted to signaling and control. In FIG. 2, "R" denotes a reserved slot; "S1" through "S4" denote signaling time slots; "F" denotes framing; "SR" denotes systems communications service request channel; and "DL" denotes data link. In the signaling time slots of each frame, the arrows indicate the signaling time slots for the channels. The word structure for each time slot is also shown.

Figure 3A:
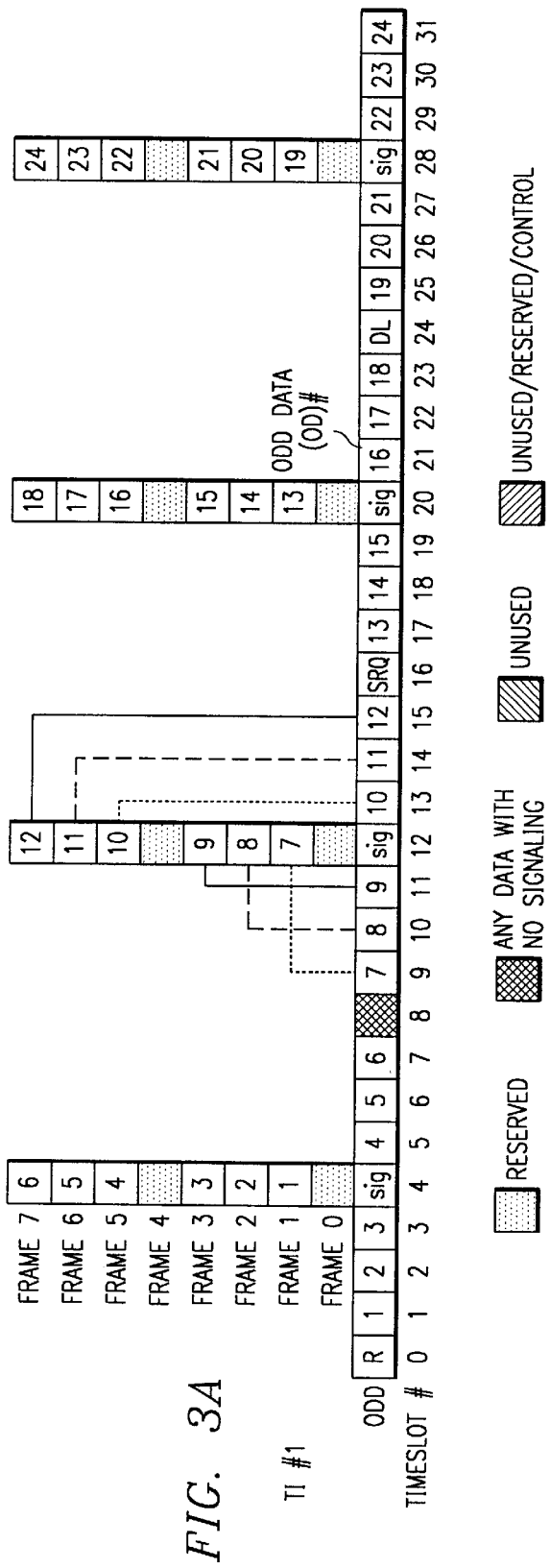
FIGS. 3A and 3B are exemplary mapping diagrams for the subscriber bus.
Figure 3B:
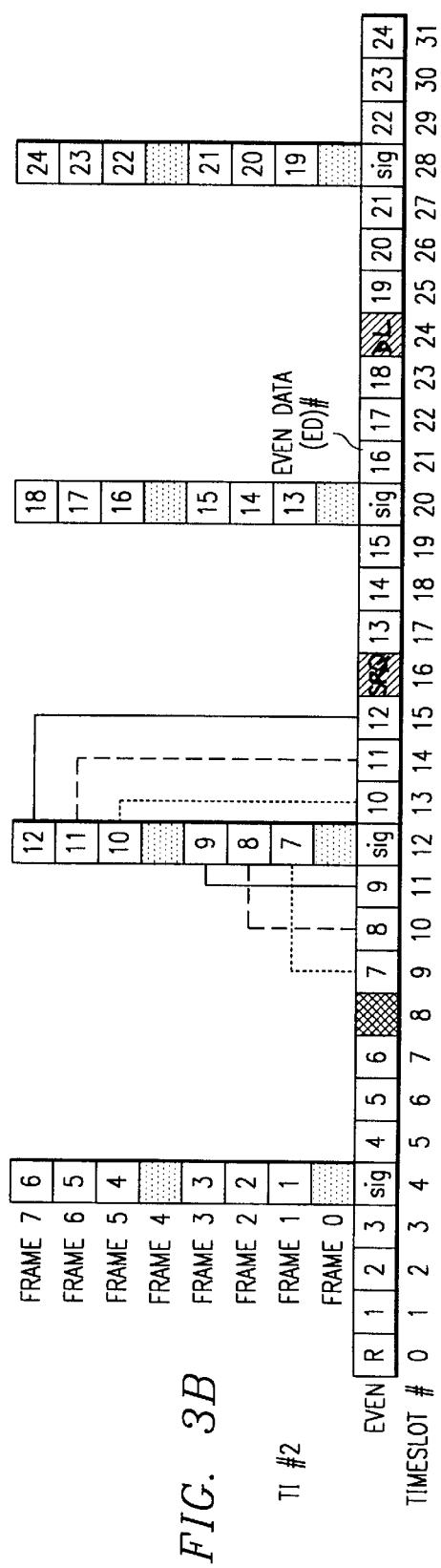

Subscriber bus 26 may be comprised of two bit-interleaved ODD and EVEN data streams. FIGS. 3A and 3B show the data and signaling format for the ODD and EVEN data streams which are used to transport two DS1 or T1 signals.

It may be seen that the T1 #1 data channels and signaling and control channels are mapped to the ODD data stream and the T1 #2 data channels and signaling and control channels are mapped to the EVEN data stream. In the embodiment shown in FIGS. 3A and 3B, the mapping is as follows for both data streams: time slot 0 is reserved, time slots 1–3 are mapped data channels 1–3, time slots 5–7 are mapped data channels 4–6, time slots 9–11 are mapped data channels 7–9, time slots 13–15 are mapped data channels 10–12, time slots 17–19 are mapped data channels 13–15, time slots 21–23 are mapped data channels 16–18, time slots 25–27 are mapped data channels 19–21, and time slots 29–31 are mapped data channels 22–24; time slots 4, 12, 20, and 28 are mapped signaling channels S1–S4; time slot 8 may carry any data but no signaling; time slots 16 and 24 of the ODD data stream are mapped SRQ and DL; and time slots 16 and 24 of the EVEN data stream may be used for SRQ and DL signaling, respectively, or be reserved or unused, depending on the application. It may be seen that the exact mapping of both T1 channels onto the data streams may differ than shown. Further, it is contemplated that more than two data streams may be multiplexed together to form subscriber bus 26. Constructed and operating in this manner, the subscriber bus is able to transport two T1 signals to double its bandwidth.

Although the present invention and its advantages have been described in detail, it should be understood that various changes, substitutions and alterations can be made therein without departing from the spirit and scope of the invention as defined by the appended claims.

What is claimed is:

1. In a channel bank having a subscriber bus having a thirty-two time slot frame, comprising:
    an odd data stream carrying data channels and signaling and control channels of a first T1 signal;
    an even data stream carrying data channels and signaling and control channels of a second T1 signal; and
    the odd and even data streams being bit-interleaved and transported in the thirty-two time slot frame of the subscriber bus.

2. The channel bank, as set forth in claim 1, wherein the odd data stream comprises data channels 1–24 of the first T1 signal.

3. The channel bank, as set forth in claim 1, wherein time slots 1–3, 5–7, 9–11, 13–15, 17–19, 21–23, 25–27, and 29–31 of the odd data stream comprises data channels 1–24 of the first T1 signal, respectively.

4. The channel bank, as set forth in claim 1, wherein the even data stream comprises data channels 1–24 of the second T1 signal.

5. The channel bank, as set forth in claim 1, wherein time slots 1–3, 5–7, 9–11, 13–15, 17–19, 21–23, 25–27, and 29–31 of the even data stream comprises data channels 1–24 of the second T1 signal, respectively.

6. The channel bank, as set forth in claim 1, wherein time slots 16 and 24 of the odd data stream comprises signaling and control time slots SRQ and DL, respectively, of the first T1 signal.

7. The channel bank, as set forth in claim 1, wherein time slots 16 and 24 of the even data stream comprises signaling and control time slots SRQ and DL, respectively, of the second T1 signal.

8. The channel bank, as set forth in claim 1, wherein time slots 16 and 24 of the even data stream are unused or reserved.

9. The channel bank, as set forth in claim 1, wherein time slots 4, 12, 20, and 28 of the odd data stream comprises signaling time slots S1–S4, respectively, of the first T1 signal.

10. The channel bank, as set forth in claim 1, wherein time slots 4, 12, 20, and 28 of the even data stream comprises signaling time slots S1–S4, respectively, of the second T1 signal.

11. The channel bank, as set forth in claim 1, wherein time slot 0 of the odd data stream is reserved.

12. The channel bank, as set forth in claim 1, wherein time slot 0 of the even data stream is reserved.

13. A subscriber loop equipment having a bus, comprising:
    an odd data stream having time slots 1–3, 5–7, 9–11, 13–15, 17–19, 21–23, 25–27, and 29–31 carrying data channels 1–24 of a first T1 signal;
    an even data stream having time slots 1–3, 5–7, 9–11, 13–15, 17–19, 21–23, 25–27, and 29–31 carrying data channels 1–24 of a second T1 signal; and
    the odd and even data streams being bit-interleaved and transported on the bus.

14. The subscriber loop equipment, as set forth in claim 13, wherein the odd data stream comprises signaling and control time slots SRQ and DL of the first T1 signal.

15. The subscriber loop equipment, as set forth in claim 13, wherein time slots 16 and 24 of the odd data stream comprises signaling and control time slots SRQ and DL, respectively, of the first T1 signal.

16. The subscriber loop equipment, as set forth in claim 13, wherein the odd data stream comprises signaling time slots S1–S4 of the first T1 signal.

17. The subscriber loop equipment, as set forth in claim 13, wherein time slots 4, 12, 20, and 28 of the odd data stream comprises signaling time slots S1–S4, respectively, of the first T1 signal.

18. The subscriber loop equipment, as set forth in claim 13, wherein the even data stream comprises signaling and control time slots SRQ and DL of the second T1 signal.

19. The subscriber loop equipment, as set forth in claim 13, wherein time slots 16 and 24 of the even data stream comprises signaling and control time slots SRQ and DL, respectively, of the second T1 signal.

20. The subscriber loop equipment, as set forth in claim 13, wherein the even data stream comprises signaling time slots S1–S4 of the second T1 signal.

21. The subscriber loop equipment, as set forth in claim 13, wherein time slots 4, 12, 20, and 28 of the even data stream comprises signaling time slots S1–S4, respectively, of the second T1 signal.

22. A method for mapping a first and second T1 signals onto a subscriber bus, comprising the steps of:
    mapping data channels of the first T1 signal onto predetermined time slots of an odd data stream;
    mapping signaling and control channels of the first T1 signal onto other predetermined time slots of the odd data stream;
    mapping data channels of the second T1 signal onto predetermined time slots of an even data stream;
    mapping signaling and control channels of the second T1 signal onto other predetermined time slots of the even data stream; and
    bit interleaving the odd and even data streams for transport on the subscriber bus.

23. The method, as set forth in claim 22, wherein the first T1 signal data channels mapping step comprises the step of mapping data channels 1–24 onto time slots 1–3, 5–7, 9–11, 13–15, 17–19, 21–23, 25–27, and 29–31 of the odd data stream.

24. The method, as set forth in claim 22, wherein the second T1 data channels mapping step comprises the step of mapping data channels 1–24 onto time slots 1–3, 5–7, 9–11, 13–15, 17–19, 21–23, 25–27, and 29–31 of the even data stream.

25. The method, as set forth in claim 22, wherein the first T1 signal signaling and control channel mapping step comprises the step of mapping an SRQ and a DL signaling channels onto time slots 16 and 24 of the odd data stream.

26. The method, as set forth in claim 22, wherein the second T1 signal signaling and control channel mapping step comprises the step of mapping an SRQ and a DL signaling channels onto time slots 16 and 24 of the even data stream.

27. The method, as set forth in claim 22, wherein the first T1 signal signaling and control channel mapping step comprises the step of mapping S1–S4 signaling channels onto time slots 4, 12, 20, and 28, respectively, of the odd data stream.

28. The method, as set forth in claim 22, wherein the second T1 signal signaling and control channel mapping step comprises the step of mapping S1–S4 signaling channels onto time slots 4, 12, 20, and 28, respectively, of the even data stream.

* * * * *

UNITED STATES PATENT AND TRADEMARK OFFICE
CERTIFICATE OF CORRECTION

PATENT NO. : 5,875,191
DATED : February 23, 1999
INVENTOR(S) : Deschaine, et al.

It is certified that error appears in the above-identified patent and that said Letters Patent is hereby corrected as shown below:

On the title page, Item [75] delete "Manouchehr Entezari" and insert -- Manoucher Entezari --.

Signed and Sealed this

Third Day of August, 1999

Attest:

Q. TODD DICKINSON

Attesting Officer

Acting Commissioner of Patents and Trademarks